(12) United States Patent
Lanning et al.

(10) Patent No.: US 8,752,779 B2
(45) Date of Patent: Jun. 17, 2014

(54) WOODY BIOMASS BENEFICIATION SYSTEM

(75) Inventors: David N. Lanning, Federal Way, WA (US); Christopher J. Lanning, Federal Way, WA (US); James H. Dooley, Federal Way, WA (US)

(73) Assignee: Forest Concepts, LLC, Auburn, WA (US)

( * ) Notice: Subject to any disclaimer, the term of this patent is extended or adjusted under 35 U.S.C. 154(b) by 128 days.

(21) Appl. No.: 13/565,492

(22) Filed: Aug. 2, 2012

(65) Prior Publication Data

US 2013/0200181 A1    Aug. 8, 2013

Related U.S. Application Data

(60) Provisional application No. 61/515,417, filed on Aug. 5, 2011.

(51) Int. Cl.
*B02C 17/00* (2006.01)
*B02C 7/00* (2006.01)

(52) U.S. Cl.
USPC ............................. 241/24.2; 241/28

(58) Field of Classification Search
USPC ............... 241/24.1, 24.19, 24.29, 28, 29; 144/335, 337, 340
See application file for complete search history.

(56) References Cited

U.S. PATENT DOCUMENTS

| | | | | |
|---|---|---|---|---|
| 3,254,847 A * | 6/1966 | Brandts et al. | ............... | 241/24.2 |
| 3,301,745 A * | 1/1967 | Coppick et al. | ................. | 162/55 |
| 3,337,139 A * | 8/1967 | William et al. | ................. | 241/20 |
| 5,577,671 A * | 11/1996 | Seppanen et al. | ............... | 241/14 |
| 5,769,330 A * | 6/1998 | Rogowski | .......................... | 241/5 |
| 6,260,777 B1 * | 7/2001 | Seppanen | ....................... | 241/19 |

* cited by examiner

*Primary Examiner* — Faye Francis
(74) *Attorney, Agent, or Firm* — Thomas F. Broderick

(57) ABSTRACT

A beneficiation process and apparatus for the continuous treatment of comminuted woody biomass, particularly hog fuel, to substantially remove mineral impurities and bark and to recover white wood therefrom for use as industrial feedstocks.

19 Claims, 1 Drawing Sheet

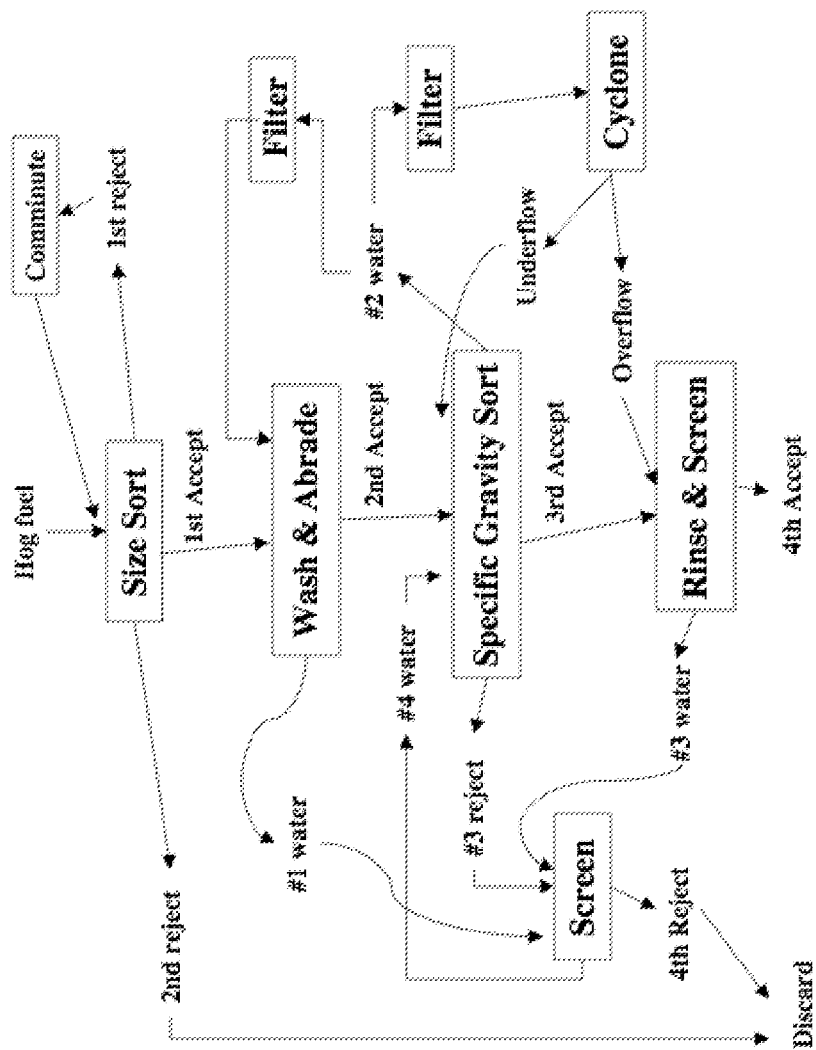

WOODY BIOMASS BENEFICIATION SYSTEM

STATEMENT OF GOVERNMENT LICENSE RIGHTS

This invention was made with government support by the CREES Small Business Innovation Research program of the U.S. Department of Agriculture, grant numbers 2008-33610-18880 and 2009-33610-01114. The government has certain rights in the invention.

FIELD OF THE INVENTION

Our invention relates to woody biomass comminution operations that sort wood fiber from bark and mineral components of the comminuted material.

BACKGROUND OF THE INVENTION

Current processing of woody biomass using tub grinders, chippers, and horizontal grinder/shredders produces commingled piles of wood, bark, needles, soil, and debris. The primary markets for such material are compost or combustion energy. Our previous characterization suggested that half or more of the comminuted biomass from forest residuals, tree service firms, and whole-tree chipping is bole or branch wood (aka "white wood") which has significant positive value as furnish for particle board, premium grade fuel pellets, fiberboard, and second generation biofuels. The difference in price between hog fuel/compost and white wood chips can be anywhere from $20 to $60 per ton. Thus, if cost-effective sorting technologies can be developed, a substantial amount of new white wood fiber will be added to the marketplace.

SUMMARY OF THE INVENTION

This invention provides a beneficiation process and apparatus for the continuous treatment of comminuted woody biomass, particularly hog fuel, to substantially remove mineral impurities and bark and to recover white wood therefrom for use as industrial feedstocks.

BRIEF DESCRIPTION OF THE DRAWING

FIG. 1 is a process flow diagram of the subject beneficiation process.

DETAILED DESCRIPTION OF THE PREFERRED EMBODIMENT

The term "beneficiation" as used herein refers to the mechanical, physical and physico-chemical processes that are applied to a raw material to make it suitable for a particular use.

"Comminution" refers to a process or machine that reduces the particle size of bulk materials.

"Woody biomass" as used herein refers to all parts of trees, shrubs and woody plants useable as industrial feedstocks for fiber, bioenergy, and biofuels, including timber harvest slash and land clearing debris, small-diameter trees, shrubs and brush, dedicated energy crops like willow and poplar, tree service prunings, and residential green waste.

"Comminuted woody biomass" refers to woody biomass materials that have been reduced to small pieces or particles by pounding, grinding, chipping, shredding, or abrading. Particular sources of comminuted woody biomass that are of suitable for the subject beneficiation process include: Arborist chips from tree service firms, landscapers, municipalities, road maintenance, storm debris and the like; such chips are typically produced by tow-behind chippers and tend to include fines, branch pieces, firewood size chunks, and debris. Ground-up land-clearing debris from urbanization, infrastructure development, road construction and similar projects; such ground material is typically processed by horizontal axis or tub grinders at the construction site or at a fixed receiving location within a short distance of the source. Ground-up logging slash from piles and windrows that are the residue of timber harvest, forest management, wildfire fireline debris, and the clearing of dead and down forest biomass. Chipped or ground-up small diameter brush, prunings, saplings and other woody biomass removed from the landscape in urban and suburban areas to reduce the risk and severity of wildland fires.

"Hog fuel" refers to an unprocessed mix of coarse chips of bark and wood fiber. Pieces run generally between a coarse grade of less than 5" to a fine grade of less than 2". Hog fuel is derived from three comminution processes: tub grinder, horizontal axis grinder, and tow-behind chipper (e.g., Vermeer® and Morbark® types).

Comminuted woody biomass serves as the input raw material or "feedstock" for the subject beneficiation process, the output of which is an industrial woody biomass feedstock containing pre-determined low levels of bark and mineral contaminants.

"Bark" refers to the tough outermost covering of the woody stems and roots of trees and other woody plants.

"White wood" and "wood fiber" as used interchangeably herein to refer to pieces and particles of bole, branch, and root wood substantially free of attached bark.

"Clean white wood" as used herein refers to beneficiated wood pieces and particles that are substantially free of bark and mineral contaminants.

"Ash" refers to the non-combustible residue left after biomass is burnt and represents the bulk mineral matter after carbon, oxygen, sulfur and water has been eliminated during combustion. Ash percentage is the weight of ash material expressed as a percentage of the original weight after the biomass is thoroughly burnt.

The comminuted woody biomass constituents of hog fuel mixtures take the form of chips, shreds, and particles of bole/branch/root wood, some with bark attached thereto and some without, detached bark pieces (with little or no white wood attached thereto), and foliage (leaves and/or needles), all admixed to varying degrees with minerals (soil, gravel, grit) and contaminants (metal shards, plastic, trash, etc.)

Table 1 shows relative ash contents of comparable size-sorted hog fuel samples following different combinations and sequences of beneficiation treatments.

TABLE 1

| # | Experimental Treatment | Final Ash Content (%) |
|---|---|---|
| 2 | Soak 120 | 5.805 |
| 1 & 7 | Control | 4.893 |
| 8 | Rinse 120 | 3.637 |
| 3 | Stir 60 + Soak 60 | 1.946 |
| 9 | Stir 60 + Rinse 60 | 1.736 |
| 10 | Dry Debark 60 + Screen | 1.628 |
| 4 | Dry Debark 120 | 1.401 |
| 5 | Dry Debark 120 + Soak 120 | 1.353 |
| 11 | Dry Debark 60 + Screen + Stir 30 + Rinse 30 | 1.162 |
| 6 | Dry Debark 120 + Stir 60 + Soak 60 | 0.86 |
| 12 | Wet Debark + Screen + Soak 30 + Rinse 30 | 0.701 |

Consistent with these experimental results, the subject beneficiation process and system for comminuted woody biomass feedstock preferably includes four sequential steps or stations—size sorting, washing & abrading, specific density sorting, and rinse & screening—which can be modified depending on the comminuted input material and the desired characteristics of the feedstock output material. A preferred embodiment is shown in process flow path in FIG. 1.

The Size Sorting step removes oversized and undersized materials from a raw woody biomass comminuted feedstock, to recover a first accept fraction of materials that generally correspond in size range to the desired industrial feedstock. "Size range" in this sense refers generally to the cross-sectional diameters (thickness or thinness) of the component pieces in a material mixture, and hence the ability of individual pieces to pass through screen openings of pre-selected diameters. A pre-selected cross section range of from 2" (50 mm) to ¼" (6 mm) is described in this representative embodiment. In practice, the maximum dimension desired for industrial woody biomass feedstocks may be selected between 3 inches or 2 inches (60 mm) and 1.5 inches, and the minimum dimension selected between ¼ inch and ⅜ inch inches.

The size sorting step can be accomplished on a conventional single bar, finger, or star screen, but is preferably performed by using a pair of conventional rotary or shaker screens as a sizing station that receives the input comminuted feedstock. The top screen will typically have 2" openings. Comminuted material larger (wider) than this will cascade over the screen and such overs will typically directed to recomminution. The bottom screen will typically have ¼" openings. Undersize pieces that pass through the bottom screen are classified as fines. Material that drops through the top screen and is retained on the bottom screen is acceptable material (accepts).

Thus, a first sorting screen has openings corresponding to a pre-selected maximum cross-section dimension (e.g., 2 inches), and a second sorting screen has openings corresponding to the pre-selected minimum cross-section dimension (e.g., ¼ inch). As indicated in FIG. 1, the size sorting station produces a first reject fraction of oversize material that does not pass through the first sorting screen, a first accept fraction of material that passes through the first sorting screen but does not pass through the second sorting screen, and a second reject fraction of undersize material that passes through the first and second sorting screens. The oversize material that constitutes the first reject fraction typically includes larger pieces of wood and/or bark that may be subject to additional comminution and then cycled back through the sizing station. The undersize material that constitutes the second reject fraction typically contains mixed wood, bark, and mineral pieces that may discarded or used for compost.

The recovered first accept fraction will typically contain white wood, wood with attached bark, bark, foliage, minerals, and contaminants that have passed through the larger but not the smaller of the sorting screens. This size-sorted first accept fraction serves as the input feedstock for the three-step beneficiation process described below.

The Wash & Abrade step detaches surface dirt and bark from the woody biomass and removes undersized materials from the abraded mixture. Our preferred apparatus for these purposes is a wet drum flail debarker having an outer screen with openings corresponding to the pre-selected minimum dimension. The first accept fraction is introduced into the drum debarker and subjected to abrasion during a residence time sufficient (as monitored by visual or optical inspection) to (1) detach substantially all bark from white wood and (2) comminute constituent bark pieces to a suitable degree for the desired industrial feedstock. During the abrasion the contents of the drum are subjected to continuous washing with a large volume of low-pressure water. The water and undersize abraded material pass through the outer screen openings as a first water fraction. Recovered from the drum debarker is a second accept fraction of abraded material that does not pass through the outer screen openings.

The Specific Density Sort step serves primarily to reduce the ash content of the incoming material. As a whole, the incoming material is hog fuel from various sources. However, by the time the material reaches the washing portion of the process several modifications to the material have been made. Namely, the hog fuel has been processed through either a flail or drum debarking machine and screened to 6 mm (0.24"), which significantly reduces the quantity of friable material and fines entrained in the hog fuel. 75 mm (3 inch) and over material is separated as well. This leaves a relatively specific product entering an independent washing process.

Having been screened, tumbled, whacked, and spun, the material entering the washer has little or no bark attached. Any dirt remaining on the wood is either fine dust or is thoroughly engrained. Apart from the wood there can also be pieces of glass or rocks that were retained by the screens. Thus, the primary purpose of the washer is to remove as much dust and engrained dirt as possible in addition to rocks or non-wood contaminants.

A secondary purpose is to convey the desired material effectively to the next process and the rejected portion to an appropriately separated location. The proposed flow rate of the incoming process is 23 kg/min (50 lbs/min) or 9000 kg/day (10 tons per day). However, a significant portion (about 20%) is removed in the debarking and fines screening processes, leaving about 18.5 k g/min (40 lbs/min) to be washed. Of this, approximately 3%, or 0.6 kg/min (1.2 lbs/min) is heavy debris that needs to be removed.

The Rinse & Sort step washes the accept fraction from the float tank and removes fines.

CONCLUSIONS

Having examined several different modes of washing and looking into equipment previously manufactured for this purpose, this study shows that reprocessing hog fuel into a higher value and lower ash content product is possible with the appropriate combination of washing and handling technologies. Further, washing the wood while simultaneously debarking is advantageous not only in grit removal effectiveness, but also in reducing the required number of processes. Subsequently floating the material and then rinsing it on a screening produces the lowest ash content material without sacrificing excessive amounts of white wood. While water cannot be eliminated from the system without greatly reducing its effectiveness, wet debarking followed by brief floating and rinsing on a screen minimizes the time the hog fuel spends submerged in water and thereby minimizes its moisture uptake.

While the preferred embodiment of the invention has been illustrated and described, it will be appreciated that various changes can be made therein without departing from the spirit and scope of the invention.

We claim:

1. A process for the beneficiation of a comminuted woody biomass feedstock, comprising four steps:
   first, sort the feedstock by size on one or more sorting screens, and recover a first reject fraction of oversize material characterized by cross section dimensions larger than a pre-determined maximum dimension, a second reject fraction of undersize material characterized by cross section dimensions smaller than a pre-determined minimum dimension, and a first accept fraction of material characterized by cross section dimensions larger than the minimum dimension and smaller than the maximum dimension;

second, wash and abrade the first accept fraction in a wet debarker having an undersize screen with openings corresponding to the minimum dimension, and recover a second accept fraction of material that does not pass through the undersize screen openings, and a first water fraction containing material that passes through the undersize screen openings;

third, sort the second accept fraction by specific density in a water tank, and recover a third accept fraction of material that floats, a third reject fraction of material that sinks, and a second water fraction containing suspended material; and fourth, rinse and sort the third accept fraction on a rinsing screen having openings corresponding to the minimum dimension, and recover a third water fraction containing material that passes through the rinsing screen, and a fourth accept fraction comprising substantially clean white wood pieces characterized by cross section dimensions larger than the minimum dimension and smaller than the maximum dimension.

2. The process of claim 1, wherein the first step comprises: sort the feedstock by size on first and second sorting screens, the first sorting screen having openings corresponding to the maximum dimension and the second sorting screen having openings corresponding to the minimum dimension, and recover a first reject fraction of oversize material that does not pass through the first sorting screen, a second reject fraction of undersize material that passes through the second sorting screen; and a first accept fraction of material that passes through the first sorting screen but does not pass through the second sorting screen.

3. The process of claim 2, wherein the first and second sorting screens are oscillating screens.

4. The process of claim 1, comprising the additional steps of comminuting the first reject fraction of oversize material to produce comminuted outflow material, and delivering the comminution outflow material to the one or more sorting screens.

5. The process of claim 1, wherein the rinsing screen is a vibratory screen.

6. The process of claim 1, wherein the maximum dimension is between 3 and 1.5 inches.

7. The process of claim 5, wherein the maximum dimension is 2 inches.

8. The process of claim 1, wherein the minimum dimension is between ¼ and ⅜ inch.

9. The process of claim 5, wherein the minimum dimension is ¼ inch.

10. The method of claim 1, comprising the additional step of passing the first water fraction, the third reject fraction, and the third water fraction through a waste screen having openings of approximately 1/32 inch, to recover a fourth reject fraction of material that does not pass through the waste screen, and a fourth water fraction that passed through the waste screen.

11. The process of claim 10, wherein the waste screen is a vibratory screen.

12. The process of claim 10, comprising the additional step of combining the second reject fraction and the fourth reject fraction, to recover a fifth accept fraction.

13. The method of claim 10, comprising the additional step of delivering the fourth water fraction to the water tank.

14. The method of claim 1, comprising the additional steps of dividing the second water fraction into first and second streams, and delivering the first stream to the wet debarker and the second stream to the rinsing screen.

15. The method of claim 14, comprising the additional steps of passing the first stream through a first sand filter and delivering the outflow water from the first sand filter to the wet debarker.

16. The method of claim 14, comprising the additional steps of passing the second stream through a sand filter, passing outflow water from the sand filter through a cyclone filter, and delivering overflow water from the cyclone filter to the rinsing screen.

17. The method of claim 16, comprising the additional step of delivering underflow water from the cyclone filter to the water tank.

18. The method of claim 1, wherein the fourth accept fraction comprises at least 50% of the white wood content of the comminuted woody biomass feedstock.

19. The method of claim 1, wherein the fourth accept fraction comprises less than 50% of the bark content of the comminuted woody biomass feedstock.

* * * * *